United States Patent
Huang et al.

(10) Patent No.: US 11,531,256 B2
(45) Date of Patent: Dec. 20, 2022

(54) PROJECTION SYSTEM AND FURNITURE

(71) Applicant: SEIKO EPSON CORPORATION, Tokyo (JP)

(72) Inventors: chih hao Huang, New Taipei (TW); Shao pai Huang, New Taipei (TW)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/490,851

(22) Filed: Sep. 30, 2021

(65) Prior Publication Data

US 2022/0107554 A1    Apr. 7, 2022

(30) Foreign Application Priority Data

Oct. 1, 2020   (JP) .............................. JP2020-166838

(51) Int. Cl.
*G03B 21/14* (2006.01)
*G03B 21/26* (2006.01)

(52) U.S. Cl.
CPC .......... *G03B 21/145* (2013.01); *G03B 21/26* (2013.01)

(58) Field of Classification Search
None
See application file for complete search history.

(56) References Cited

U.S. PATENT DOCUMENTS

2005/0280784 A1    12/2005    Katase et al.

FOREIGN PATENT DOCUMENTS

| CN | 1710486 A | 12/2005 | |
| CN | 210807547 U | 6/2020 | |
| DE | 202007000637 U1 * | 4/2007 | ............. A47B 37/02 |
| JP | 2010-217331 A | 9/2010 | |
| JP | 2015161833 A * | 9/2015 | |

* cited by examiner

*Primary Examiner* — Bao-Luan Q Le
*Assistant Examiner* — Danell L Owens
(74) *Attorney, Agent, or Firm* — Oliff PLC

(57) ABSTRACT

A projection system includes a projector configured to project image light and furniture on which the projector is mounted. The furniture includes a furniture main body, a setting section provided in the furniture main body and houses the projector, and an opening and closing member provided in an opening through which the image light passes, the opening and closing member switching a closed state in which the opening is closed and an open state in which the opening is opened. By aligning the opening and closing member with a position corresponding to a projection surface in the open state, a position of the projector is determined in a predetermined projection position with respect to the projection surface. The projector projects the image light onto the projection surface from the predetermined projection position to thereby form a rectangular projection image on the projection surface.

8 Claims, 12 Drawing Sheets

PROJECTION SYSTEM AND FURNITURE

The present application is based on, and claims priority from JP Application Serial Number 2020-166838, filed Oct. 1, 2020, the disclosure of which is hereby incorporated by reference herein in its entirety.

BACKGROUND

1. Technical Field

The present disclosure relates to a projection system, a control device, and furniture.

2. Related Art

There has been known furniture such as a cabinet used for setting of a projector. JP-A-2010-217331 (Patent Literature 1) discloses a cabinet that houses a projector.

A projector needs to be set in an appropriate position with respect to a screen. When the projector is housed in the cabinet described in Patent Literature 1, it takes time to move the projector because the projector has to be moved together with the cabinet in order to adjust the position of the projector.

SUMMARY

An aspect of the present disclosure is directed to a projection system including: a projector configured to project image light; and furniture on which the projector is mounted. The furniture includes: a furniture main body; a setting section provided in the furniture main body, the projector being set in the setting section; and an opening and closing member provided in an opening for allowing the image light projected by the projector to pass, the opening and closing member switching a closed state in which the opening is closed and an open state in which the opening is opened. By aligning the opening and closing member with a position corresponding to a projection surface in the open state, a position of the projector is determined in a predetermined projection position with respect to the projection surface. The projector projects the image light onto the projection surface from the predetermined projection position to thereby form a rectangular projection image on the projection surface.

Another aspect of the present disclosure is directed to furniture on which a projector that projects image light is mounted, the furniture including: a furniture main body; a setting section provided in the furniture main body, the projector being set in the setting section; and an opening and closing member provided in an opening for allowing the image light projected by the projector to pass, the opening and closing member switching a closed state in which the opening is closed and an open state in which the opening is opened. By aligning the opening and closing member with a position corresponding to a projection surface in the open state, a position of the projector is determined in a predetermined projection position where the projector forms a rectangular projection image on the projection surface.

DESCRIPTION OF EXEMPLARY EMBODIMENTS

Figure 1:
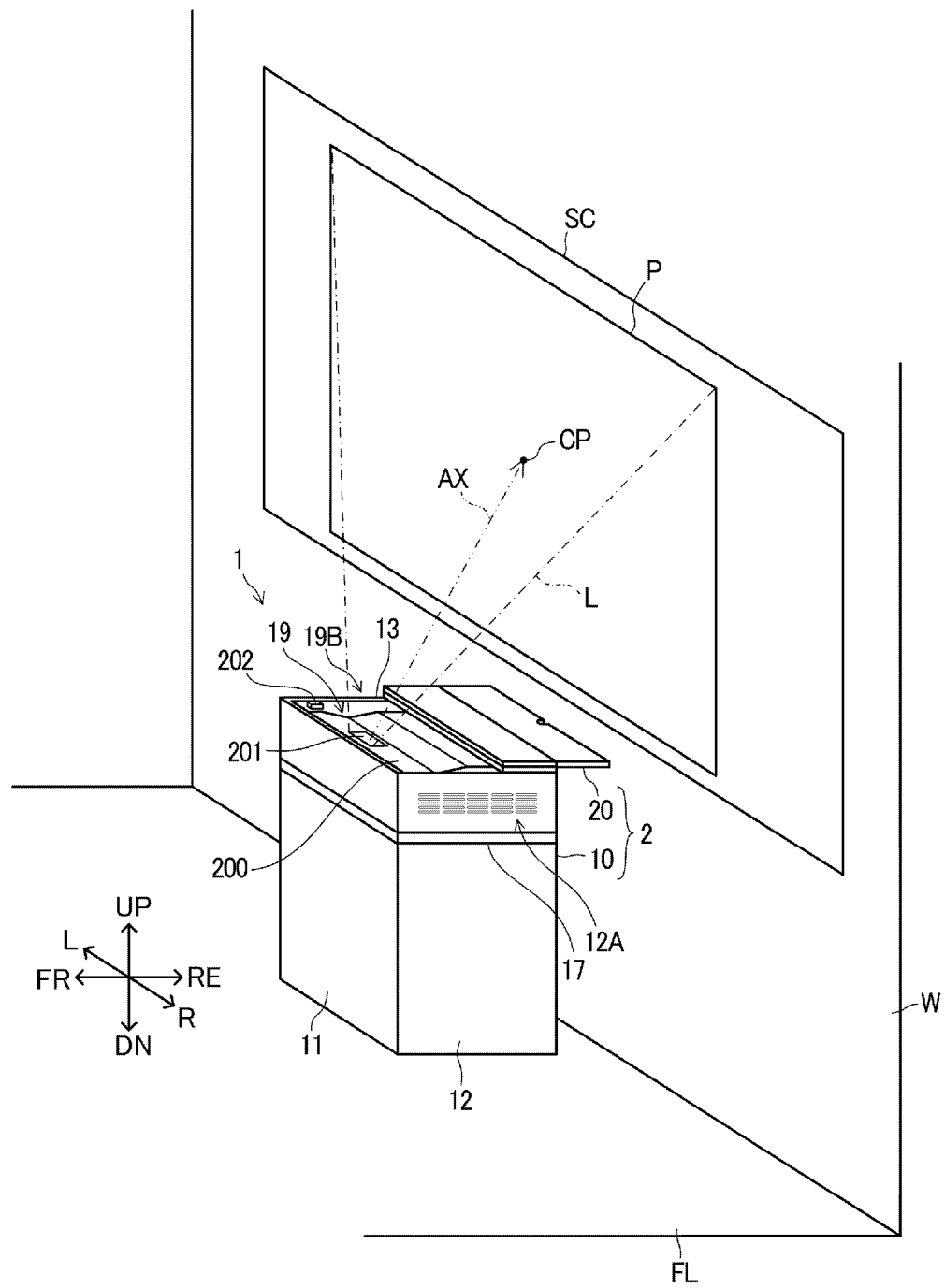
FIG. 1 is a diagram showing a specification state of the configuration of a projection system.

FIG. 1 is a diagram showing a schematic configuration of a projection system 1.

The projection system 1 includes a cabinet 2 and a projector 200 mounted on the cabinet 2. The cabinet 2 corresponds to an example of furniture.

The cabinet 2 includes a cabinet main body 10 and a lid 20.

The cabinet main body 10 includes a front panel 11, a right side panel 12, a left side panel 13, a rear panel 14, and a bottom panel 16. The cabinet main body 10 has a box shape as a whole. The cabinet main body 10 corresponds to an example of the furniture main body.

In the following explanation, right, left, upward, and downward directions are decided based on a setting position of the cabinet 2 shown in FIG. 1. Front and rear directions are decided based on the cabinet main body 10 shown in FIG. 1. Therefore, a screen SC is located behind the cabinet main body 10.

In FIG. 1 and figures referred to below, right is indicated by a sign R, left is indicated by a sign L, upward is indicated by a sign UP, downward is indicated by a sign DN, front is indicated by a sign FR, and rear is indicated by a sign RE.

A housing section 19 for housing the projector 200 is provided in an upper part of the cabinet main body 10. The projector 200 is set on a floor FL together with the cabinet main body 10 in a state in which the projector 200 is housed in the housing section 19. The floor FL corresponds to an example of the setting surface. The housing section 19 can be considered a setting section in which the projector 200 is set.

An opening section 19B is provided on the top surface of the cabinet main body 10. The opening section 19B exposes the housing section 19 and the projector 200 housed in the housing section 19. That is, the housing section 19 communicates with a setting space of the cabinet 2 upward through the opening section 19B. The opening section 19B corresponds to an example of the opening.

The lid 20 is attached to an upper part of the cabinet main body 10. The lid 20 is attached to the upper end of the cabinet main body 10 and can be opened and closed. In other words, the lid 20 switches a closed state in which the opening section 19B is closed and an open state in which at least a part of the opening section 19B is opened. The lid 20 can be manually opened and closed. For example, a user operating the projection system 1 holds the lid 20 and opens and closes the lid 20. The lid 20 corresponds to an example of an opening and closing member.

The projector 200 projects image light L from a projection light source section 201 toward a projection target. The projection target is not particularly limited but is a plane such as a wall surface. This is referred to as projection surface. In this embodiment, as an example of the projection surface, the screen SC disposed along a wall W is set as the projection target. The projection surface is not limited to a plane of a rigid body and may be a curtain formed of cloth or sheet. A part of the wall W may be used as the screen SC.

The projector 200 includes the projection light source section 201. The projection light source section 201 indicates a part where the image light L generated on the inside of the projector 200 exits to the outside of a housing of the projector 200. The projection light source section 201 is not limited to a configuration in which a specific optical component is disposed in the position of the projection light source section 201. In other words, the projection light source section 201 is an emission port from which the projector 200 emits the image light L and may be an opening or may be covered by a translucent plate such as glass or synthetic resin. An optical component such as a lens or a mirror configuring a projection optical system 223 of the projector 200 explained below may be disposed in the position of the projection light source section 201.

When the projector 200 is set in a predetermined projection position opposed to the screen SC, a projection image P is formed on the screen SC by the image light L.

As shown in FIG. 1, the projection light source section 201 of the projector 200 is exposed in a state in which the lid 20 is opened. Consequently, the projector 200 is capable of projecting the image light L.

In this embodiment, the projector 200 projects the image light L backward from the projection light source section 201 located in a front part of the cabinet 2.

In the following explanation, as an example of an indicator of a projection direction in which the projector 200 projects the image light L, an optical axis AX is illustrated. The optical axis AX is an imaginary axis indicating a track of light forming an image center CP, which is the center of the projection image P. The optical axis AX can also be considered a straight line connecting the projection light source section 201 and the image center CP.

An opening and closing detecting section 202 is disposed in the cabinet main body 10. The opening and closing detecting section 202 is a detecting section that detects that the lid 20 is opened. The opening and closing detecting section 202 only has to be able to at least detect that the lid 20 is opened from a closed state. Further, the opening and closing detecting section 202 is more preferably configured to be capable of detecting that the lid 20 is closed. The opening and closing detecting section 202 corresponds to an example of the detecting section. The opening and closing detecting section 202 is wire-connected to the projector 200 by a cable 203 explained below.

The opening and closing detecting section 202 may include, for example, an illuminance sensor and may be configured to detect external light from the lid 20 side of the opening and closing detecting section 202. In this case, based on a change in a detection light amount of the illuminance sensor at the time when the lid 20 is opened from the closed state, the opening and closing detecting section 202 detects that the lid 20 is opened.

The opening and closing detecting section 202 may include, for example, an opening and closing sensor of a switch type. Specifically, for example, the opening and closing detecting section 202 includes a not-shown operator and the lid 20 comes into contact with the operator when the lid 20 is closed. In this case, the opening and closing detecting section 202 can discriminate, based on the position of the operator, whether the lid 20 is closed or opened and can detect that the lid 20 is opened.

The opening and closing detecting section 202 may include, for example, a proximity sensor and may be configured to detect whether the lid 20 is near the opening and closing detecting section 202. Specifically, examples of the opening and closing detecting section 202 include proximity sensors of an ultrasonic type and a magnetic type. As the proximity sensor of the magnetic type, a magnet is disposed in one of the lid 20 and the opening and closing detecting section 202 and a magnetic body is disposed in the other. An opening and closing state of the lid 20 can be detected by electrically or physically detecting a magnetic interaction between the magnet and the magnetic body. In this case, the opening and closing detecting section 202 can discriminate whether the lid 20 is closed or opened and can detect that the lid 20 is opened.

Figure 2:
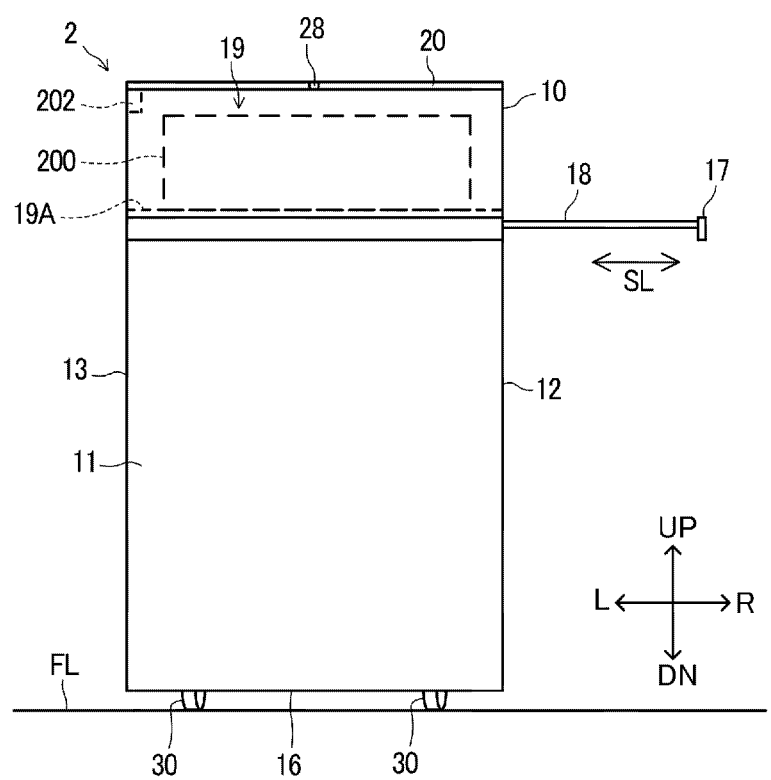
FIG. 2 is a front view of a cabinet in a closed state.
Figure 3:
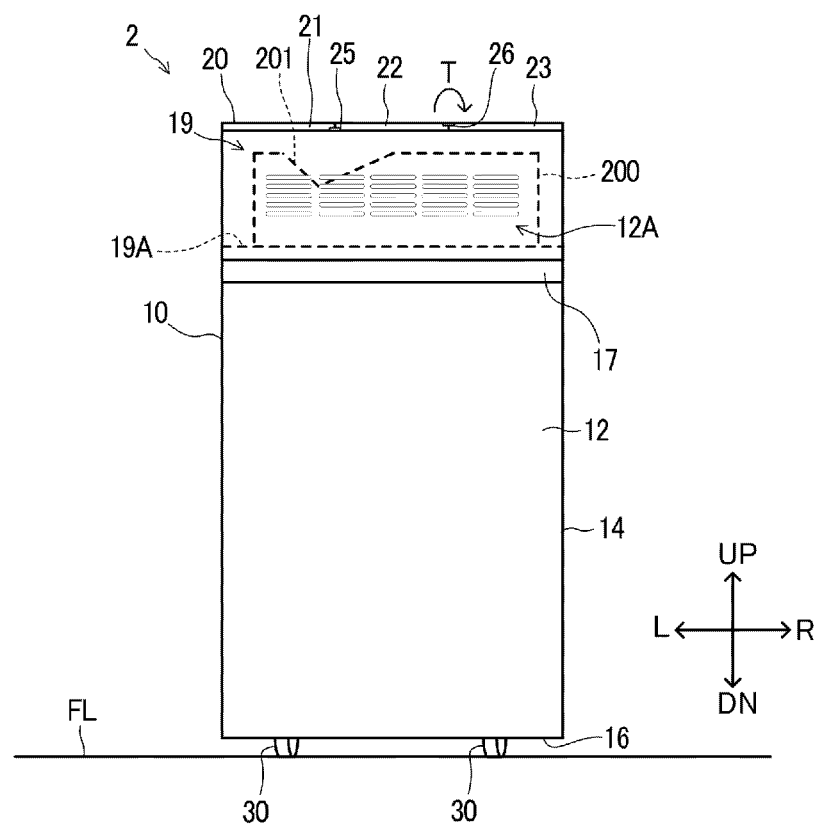
FIG. 3 is a right side view of the cabinet in the closed state.
Figure 4:
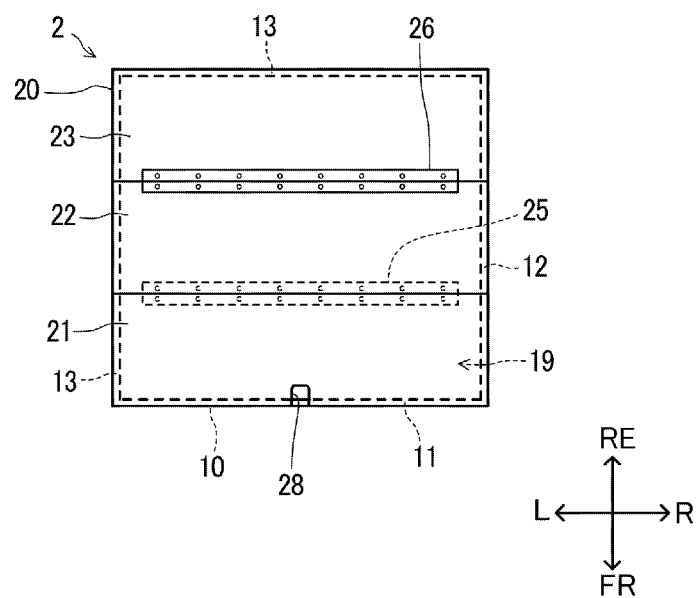
FIG. 4 is a top view of the cabinet in the closed state.

FIG. 2 is a front view of the cabinet 2 in the closed state. FIG. 3 is a right side view of the cabinet 2 in the closed state. FIG. 4 is a top view of the cabinet 2 in the closed state.

The closed state shown in FIGS. 2, 3, and 4 indicates a state of the cabinet main body 10 and is a state in which the lid 20 is closed. The position of the lid 20 in the closed state is referred to as closed position.

As shown in FIG. 2, a table 18 is provided in the cabinet main body 10. The table 18 is housed on the inside of the cabinet main body 10 and coupled to a handle 17. The handle 17 is exposed on the right side panel 12. The table 18 can be manually slid in a direction indicated by a sign SL together with the handle 17. For example, a device that supplies image data to the projector 200 can be placed on the table 18.

A bottom plate 19A is disposed in the housing section 19. The projector 200 is housed in the cabinet main body 10 in a state in which the projector 200 is placed on the bottom plate 19A. A ventilation hole 12A is opened in the right side panel 12. The ventilation hole 12A enables outdoor air to be introduced into and indoor air to be exhausted from the housing section 19.

A plurality of legs 30 that support the cabinet main body 10 are provided on the bottom panel 16. The legs 30 are configured to movably support the cabinet main body 10 on the floor FL. The legs 30 are, for example, casters including wheels. The legs 30 may adopt a configuration in which the wheels are coupled to the bottom panel 16 via bearings and a rotating direction of the wheels can be easily changed. The configuration including the casters is an example. The legs 30 may include balls.

As shown in FIG. 4, in the closed state of the cabinet main body 10, the opening section 19B is closed by the lid 20. The projection of the image light L by the projector 200 is hindered by the lid 20.

The lid 20 is configured by three lid components 21, 22, and 23, which are plate-like members. The lid component 21 and the lid component 22 are coupled by a first hinge 25. The lid component 22 and the lid component 23 are coupled by a second hinge 26.

The first hinge 25 and the second hinge 26 are coupling members capable of turning in a specific direction. The first hinge 25 is disposed on the lower surfaces of the lid component 21 and the lid component 22. The lid component 21 is coupled to the lid component 22 by the first hinge 25 to be capable of turning downward with respect to the lid component 22 in the closed state. In contrast, the second hinge 26 is disposed on the upper surfaces of the lid component 22 and the lid component 23. The lid component 22 is coupled to the lid component 23 to be capable of turning upward with respect to the lid component 23 in the closed state. A direction in which the lid component 22 is capable of turning is indicated by a sign T in FIG. 3.

A recess 28 is formed at the end portion on the front side of the lid component 21. In the recess 28, the lid component 21 is cut out to enable a user to place a finger. When the user places a finger in the recess 28 and displaces the lid component 21 upward, the first hinge 25 does not bend. Accordingly, the lid component 21 and the lid component 22 are integrally displaced upward and turn in the direction indicated by the sign T. When the lid component 21 and the lid component 22 are turned to a position where the lid component 21 and the lid component 22 overlap the lid component 23, the cabinet main body 10 is in a first open state. The lid component 23 is fixed to the cabinet main body 10.

Figure 5:
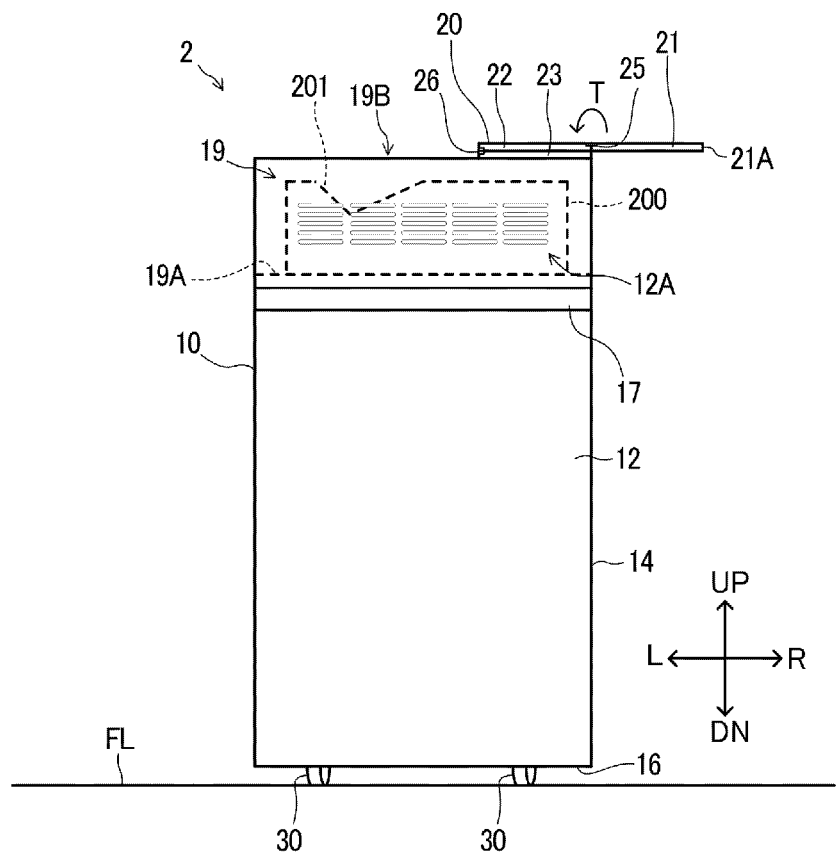
FIG. 5 is a right side view of the cabinet in a first open state.
Figure 6:
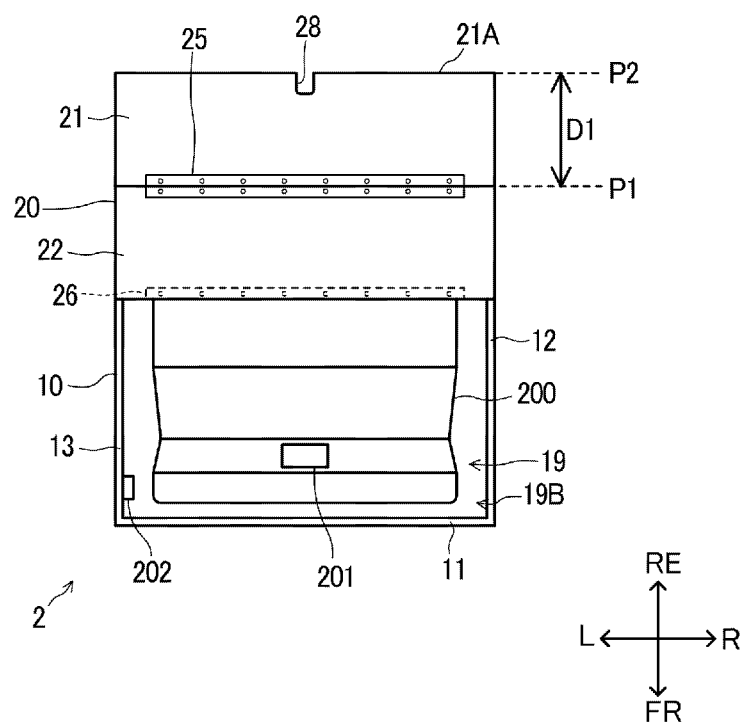
FIG. 6 is a front view of the cabinet in the first open state.

FIG. 5 is a right side view of the cabinet 2 in the first open state. FIG. 6 is a front view of the cabinet 2 in the first open state.

The first open state is a state in which the lid 20 is opened as shown in FIGS. 5 and 6. In the first open state, the opening section 19B is opened and the projector 200 set in the housing section 19 is exposed. Since the lid component 23 is fixed to the cabinet main body 10, a state in which the lid component 21 and the lid component 22 are opened is a state in which the opening section 19B is opened to the maximum.

As shown in FIG. 5, in the first open state, since the projection light source section 201 is exposed to the outside of the cabinet 2, the image light L can be projected from the projection light source section 201 toward the rear of the cabinet 2. As shown in FIG. 1, when the screen SC is located behind the cabinet 2, the projector 200 can project the projection image P onto the screen SC in the first open state.

In the first open state, the lid component 21 and the lid component 22 integrally overlap the lid component 23. The length in the front-rear direction of the lid component 21 and the lid component 22 is larger than the length in the front-rear direction of the lid component 23. Accordingly, as shown in FIG. 6, in the first open state, an end portion 21A of the lid component 21 projects further rearward than a position P1 of the rear end of the cabinet main body 10. The position P1 is, for example, the position of the rear panel 14. In other words, the end portion 21A and the lid 20 including the end portion 21A are fixed in a position where the end portion 21A and the lid 20 project from the rear panel 14 configuring a side surface of the cabinet main body 10.

The distance between the rear end position P1 of the cabinet main body 10 and a position P2 of the lid component 21 is represented as a distance D1. The distance D1 is equivalent to a projection length of the end portion 21A from the cabinet main body 10.

The lid 20 can be further folded from the first open state by turning the lid component 21 around the first hinge 25. A state in which the lid component 21 overlaps the lid component 22 is referred to as second open state of the cabinet 2.

Figure 7:
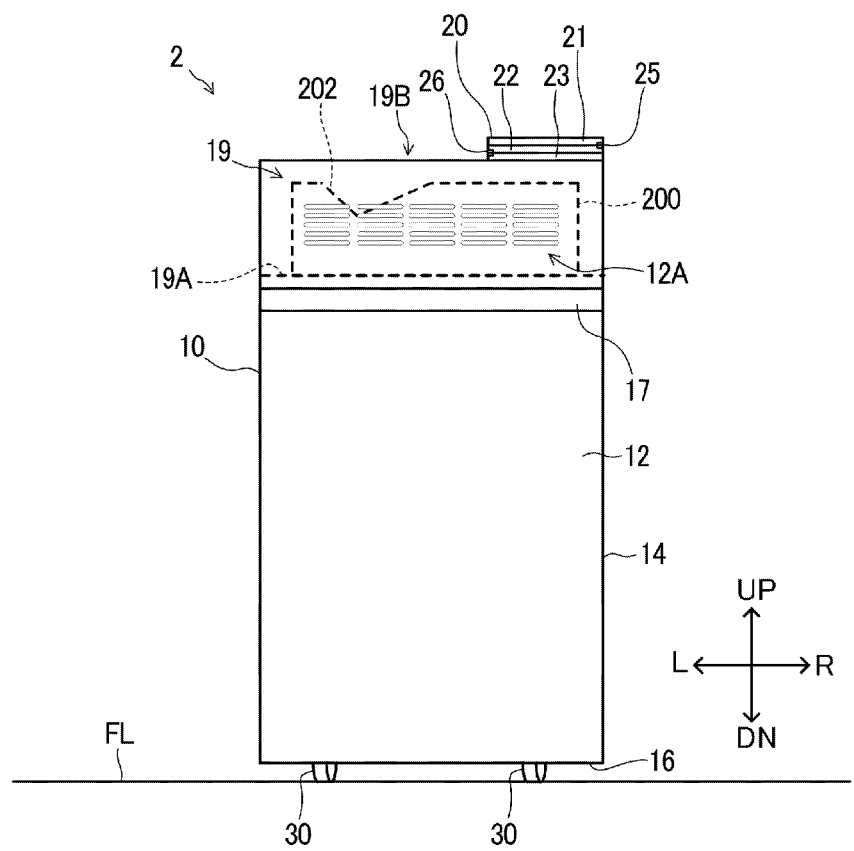
FIG. 7 is a right side view of the cabinet in a second open state.
Figure 8:
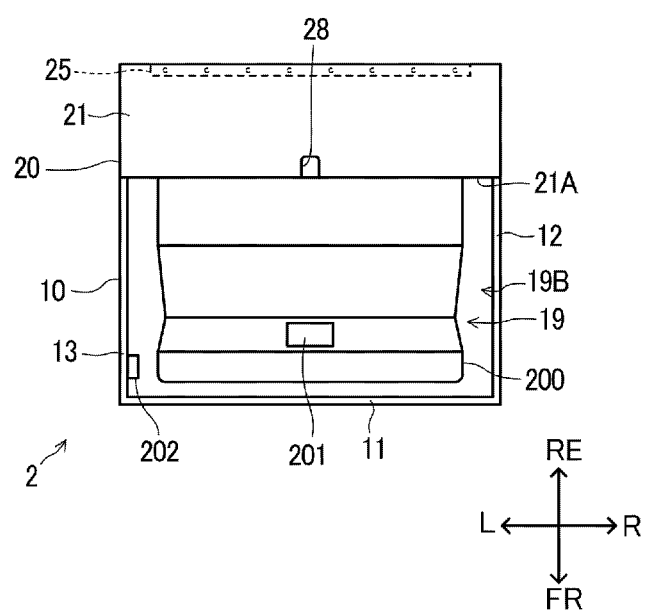
FIG. 8 is a front view of the cabinet in the second open state.

FIG. 7 is a right side view of the cabinet 2 in the second open state. FIG. 8 is a front view of the cabinet 2 in the second open state.

An opening amount of the opening section 19B does not change between the second open state and the first open state. Accordingly, switching of the first open state and the second open state of the cabinet 2 does not affect the image light L and the projection image P projected by the projector 200.

In the second open state, the lid 20 is folded such that the lid component 21 overlaps the lid component 22. In this embodiment, in the second open state, the lid components 21, 22, and 23 overlap and the end of the lid 20 overlaps the rear end position P1 of the cabinet main body 10. The portion projecting from the rear panel 14 is eliminated by switching the cabinet 2 to the second open state. Therefore, the cabinet 2 is tidy and excellent in aesthetics.

As shown in FIG. 8, in the cabinet 2, the rear part of the projector 200 is covered by the lid 20 in the second open state. This is an example. The entire projector 200 may be exposed in the open state in which the lid 20 is opened.

In the first open state, the end portion 21A of the lid component 21 projects to the rear of the cabinet main body 10. The end portion 21A functions as an indicator for positioning the projector 200 in a position suitable for projection with respect to the screen SC.

Figure 9:
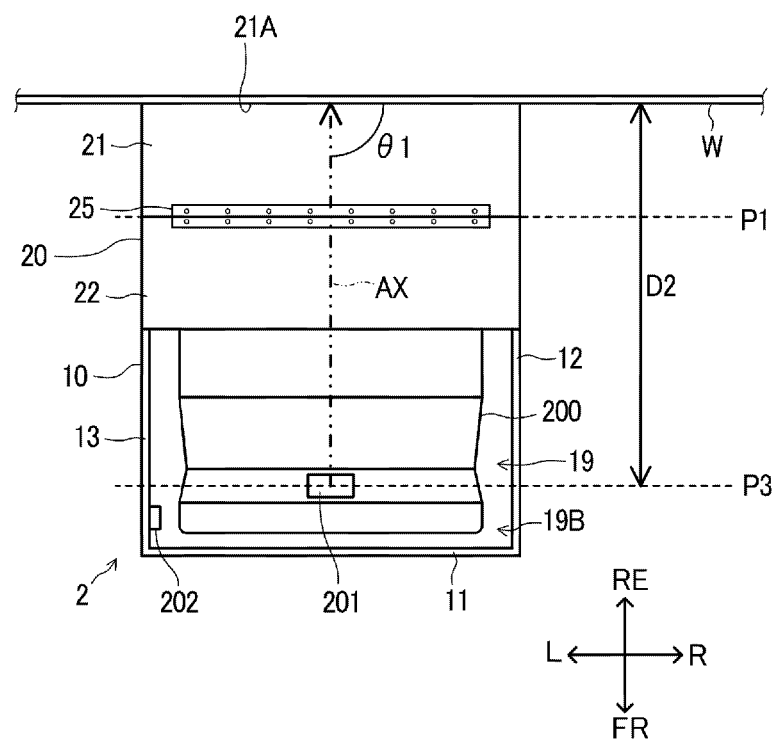
FIG. 9 is an explanatory diagram showing relative positions of a projector and a screen.
Figure 10:
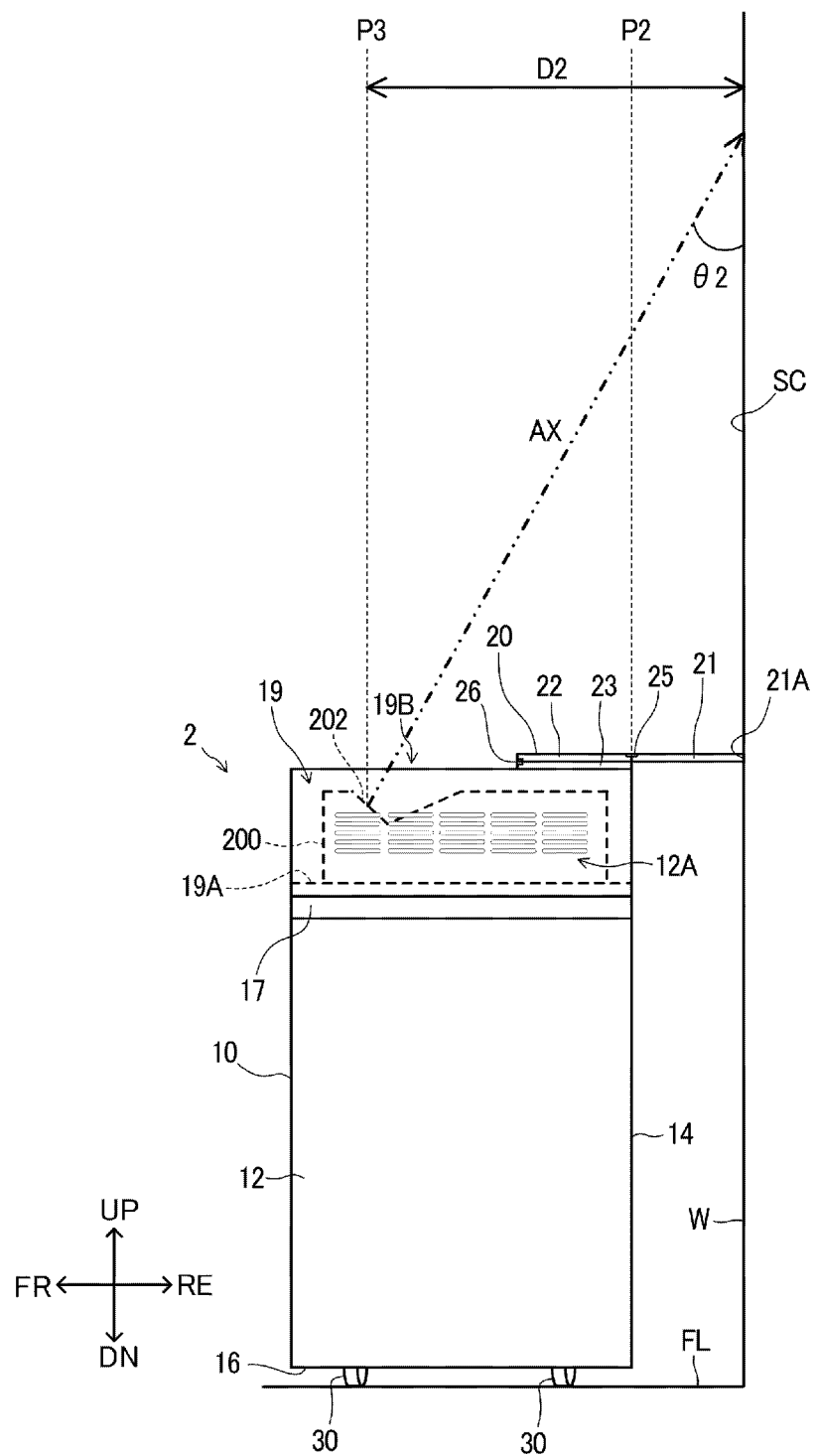
FIG. 10 is an explanatory diagram showing the relative positions of the projector and the screen.

FIGS. 9 and 10 are explanatory diagrams showing relative positions of the projector 200 and the screen SC. FIG. 9 is a top view of the cabinet 2. FIG. 10 is a side view of the cabinet 2.

FIGS. 9 and 10 show a state in which the projector 200 is disposed in a predetermined projection position suitable for projection on the screen SC.

In the projection system 1, the projector 200 can be disposed in the predetermined projection position by switching the cabinet 2 to the first open state and aligning the end portion 21A with a position corresponding to the screen SC. In this embodiment, the position of the wall W is equivalent to the position corresponding to the screen SC.

The user opens the lid 20 to set the first open state and brings the end portion 21A into contact with the wall W to thereby align the cabinet 2. The end portion 21A is a side having a predetermined length. By bringing the side into contact with the wall W, the direction of the cabinet main body 10 and the distance between the cabinet main body 10 and the screen SC are adjusted to specific states. That is, the relative positions of the projector 200 and the screen SC are determined in specific positions.

The positioning performed using the end portion 21A can be executed even when the screen SC is not provided on the wall W. For example, positioning performed using the end portion 21A can also be executed when the screen SC set apart from the floor FL and the wall W is used and when the screen SC is a soft sheet hung from a ceiling. In such a case, the user only has to set a mark in a position right under the screen SC on the floor FL, that is, a position where the screen SC is projected onto the floor FL and align the end portion 21A with the position of the mark. In this case, the mark on the floor FL is equivalent to the position corresponding to the screen SC.

Since the cabinet 2 is movably supported by the legs 30, work for aligning the end portion 21A with the position corresponding to the screen SC can be easily performed.

In a state in which the end portion 21A is aligned with the position of the wall W, as shown in FIG. 9, an angle of the optical axis AX with respect to the screen SC in a top view is a first angle θ1. The first angle θ1 is, for example, 90 degrees (radian). In this case, the optical axis AX is perpendicular to the screen SC. The projection light source section 201 is located right in front of the screen SC. In other words, the projection light source section 201 is right opposed to the screen SC.

In the state in which the end portion 21A is aligned with the position of the wall W, as shown in FIG. 10, an angle of the optical axis AX with respect to the screen SC in a side view is a second angle θ2. The second angle θ2 is a so-called angle of elevation. When the projection light source section 201 is located below the screen SC, the second angle θ2<90 degrees.

As shown in FIGS. 9 and 10, the distance from a position P3 of the projection light source section 201 to the wall W in a direction perpendicular to the wall W is a distance D2. The distance D2 can be considered the distance from the screen SC to the projection light source section 201.

In the projection image P, trapezoidal distortion occurs according to the relative positions of the projection light source section 201 and the screen SC. Trapezoidal distortion in the horizontal direction of the screen SC occurs according to the size of the first angle θ1. Trapezoidal distortion in the up-down direction of the screen SC occurs according to the size of the second angle θ2.

As explained below with reference to FIG. 11, the projector 200 includes an image processing section 235 that forms the image light L and a projection optical system 223. The image processing section 235 and the projection optical system 223 are set such that the projection image P is rectangular when the image light L is projected onto the screen SC at the first angle θ1 and the second angle θ2. Accordingly, by setting the cabinet 2 with the end portion 21A aligned with the position of the wall W, even if the user does not perform the adjustment work, it is possible to project the rectangular projection image P not having trapezoidal distortion.

The projection optical system 223 of the projector 200 is set to project the projection image P having a predetermined size set in advance when projecting the image light L onto the screen SC from a position separated by the distance D2. The predetermined size is, for example, diagonal 80 inches. The projection optical system 223 of the projector 200 is set such that a focus of the projection image P is proper when projecting the image light L onto the screen SC from the position separated by the distance D2.

Therefore, by setting the lid 20 in the first open state and aligning the end portion 21A with the position of the wall W, it is possible to project the projection image P at high quality without performing the adjustment and the setting of the projector 200.

Figure 11:
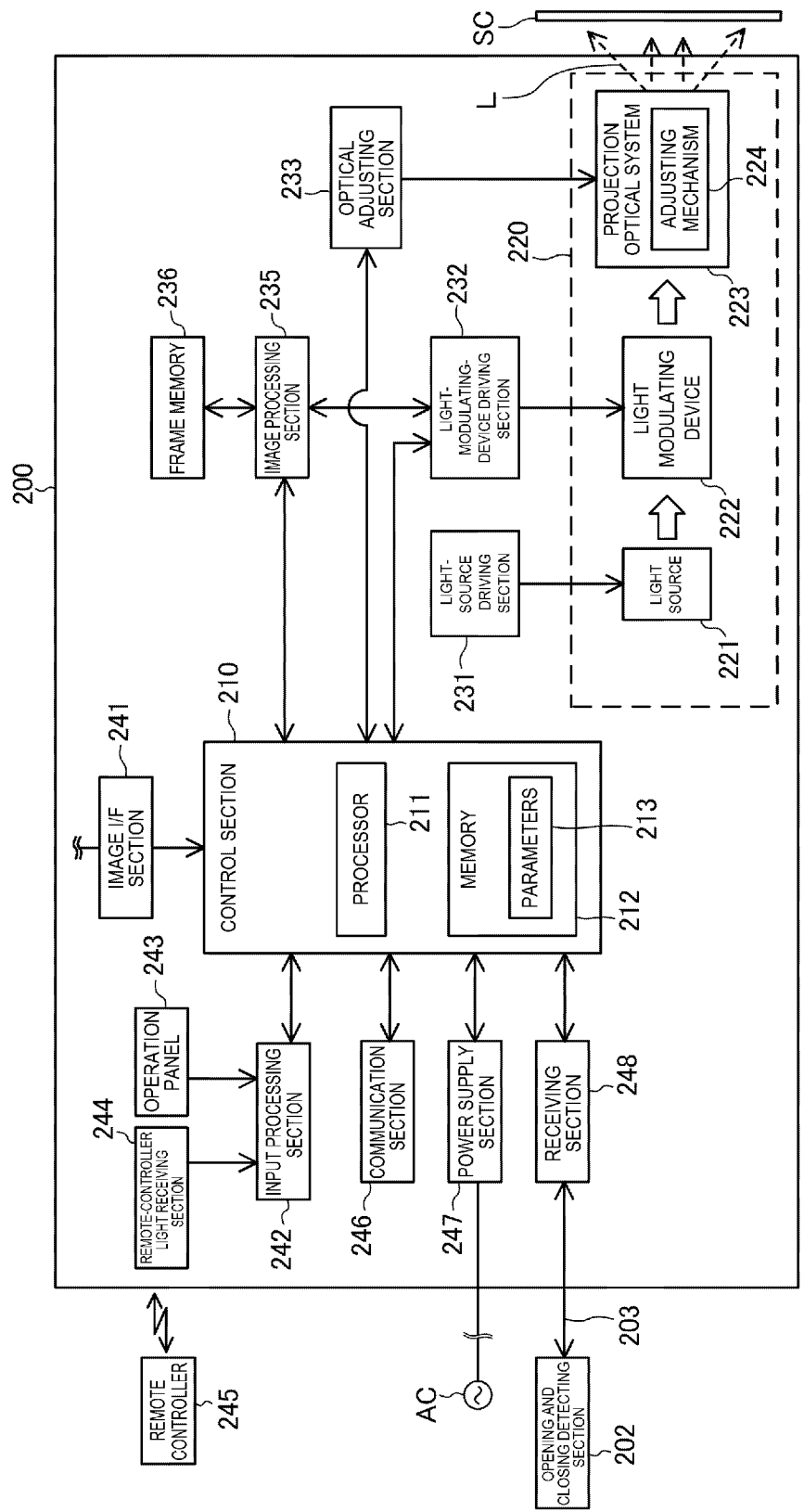
FIG. 11 is a block diagram showing the configuration of the projection system.

FIG. 11 is a block diagram showing the configuration of the projection system 1.

The projector 200 includes a control section 210 that controls the sections of the projector 200 and a projecting section 220.

The projecting section 220 includes a light source 221, a light modulating device 222, and a projection optical system 223. A light-source driving section 231, a light-modulating-device driving section 232, and an optical adjusting section 233 that operate according to the control by the control section 210 are coupled to the projecting section 220.

The light source 221 includes a lamp such as a halogen lamp, a xenon lamp, or an ultra-high pressure mercury lamp or a solid-state light source such as an LED (Light Emitting Diode) or a laser light source. The light source 221 may include a reflector and an auxiliary reflector that guide light emitted by a light source to the light modulating device 222. Further, the light source 221 may include a lens group and a polarizing plate for improving an optical characteristic of projected light, a dimming element that reduces a light amount of the light emitted by the light source on a path leading to the light modulating device 222, or the like. The light-source driving section 231 lights and extinguishes the light source of the light source 221 according to the control by the control section 210.

The light modulating device 222 includes a light modulating element and modulates light emitted by the light source 221 to generate image light. The light modulating device 222 includes, as the light modulating element, for example, three liquid crystal panels corresponding to the three primary colors of R, G and B. The liquid crystal panel may be a transmission-type liquid crystal display panel or may be a reflection-type liquid crystal display panel. The light emitted by the light source 221 is separated into, for example, color lights of three colors of R, G, and B and is made incident on the liquid crystal panels corresponding to the color lights of R, G, and B and modulated. Image lights are combined by a combination optical system such as a cross dichroic prism and emitted to the projection optical system 223. The light modulating element included in the light modulating device 222 is not limited and may be, for example, a digital micromirror device.

The light modulating device 222 is driven by the light-modulating-device driving section 232. The light-modulating-device driving section 232 is coupled to the image processing section 235 explained below. Image data corresponding to the primary colors of R, G, and B are input to the light-modulating-device driving section 232 from the image processing section 235. The light-modulating-device driving section 232 converts the input image data into a signal suitable for operation of the liquid crystal panels. The light-modulating-device driving section 232 applies a voltage to the liquid crystal panels of the light modulating device 222 based on the converted signal and draws images on the liquid crystal panels.

The projection optical system 223 includes a lens, a mirror, and the like for forming an image of incident image light on the screen SC.

The projection optical system 223 includes an adjusting mechanism 224. The adjusting mechanism 224 is a focus adjusting mechanism that performs adjustment of a focus of the projection image P by moving the lens group included in the projection optical system 223. The adjusting mechanism 224 may include a zoom adjusting mechanism for enlarging or reducing an image projected onto the screen SC.

The projector 200 includes an image processing section 235 that processes an image, a frame memory 236, and an image interface section 241. In the figures, an interface is abbreviated as I/F.

Image data of an image to be displayed on the screen SC is input to the image processing section 235 according to the control by the control section 210. The image processing section 235 develops the input image data in the frame memory 236. The image processing section 235 performs image processing on the image data developed in the frame memory 236. The image processing performed by the image processing section 235 includes geometrical correction for correcting trapezoidal distortion. The image processing performed by the image processing section 235 may include image processing such as resolution conversion processing or resize processing, correction of a distortion aberration, digital zoom processing, and adjustment of a tint and luminance of an image.

The image interface section 241 includes a connector and an interface circuit and is coupled to an image supply device different from the projector 200. For example, the image interface section 241 includes an HDMI (High-Definition Multimedia Interface) connector and an HDMI interface circuit and is coupled to the image supply device via a HDMI cable. HDMI is a registered trademark.

Specific specifications of the image interface section 241 are not limited. For example, a USB (Universal Serial Bus) cable, a VGA cable, and the like may be connectable to the image interface section 241. For example, the number of connectors included in the image interface section 241 can also be optionally changed. The image interface section 241 may include a connector to which a cable for transmitting an analog image signal is connectable and an interface circuit to which the analog image signal can be input. In this case, the image interface section 241 may include a conversion circuit that converts the analog image signal into digital image data.

The image supply device cable of coupling to the image interface section 241 only has to be a device that outputs image data. Examples of the image supply device include a personal computer, a recording media playing device such as a DVD player, a media streaming device that acquires data via a communication line and outputs image data based on the acquired data, and a communication terminal device such as a smartphone.

The projector 200 includes an input processing section 242, an operation panel 243, and a remote-controller light receiving section 244.

The operation panel 243 includes not-shown operators such as buttons and switches provided in the housing of the projector 200. The operation panel 243 receives operation on the operators, generates an operation signal corresponding to the operation, and outputs the operation signal to the input processing section 242. The input processing section 242 outputs the operation signal input from the operation panel 243 to the control section 210.

A remote controller 245 includes an operator and transmits an infrared signal according to operation of the operator.

The remote-controller light receiving section 244 receives the infrared signal transmitted from the remote controller 245, decodes the received infrared signal, and generates an operation signal. The remote-controller light receiving section 244 outputs the generated operation signal to the input processing section 242. The input processing section 242 outputs the operation signal input from the remote-controller light receiving section 244 to the control section 210.

The control section 210 includes a processor 211 and a memory 212.

The memory 212 is a storage device that stores programs to be executed by the processor 211 and data. The memory 212 is configured by a magnetic storage device, a semiconductor storage element such as a flash ROM (Read Only Memory), or a storage device of another type. The memory 212 may include a RAM (Random Access Memory) forming a work area of the processor 211. The memory 212 stores data to be processed by the control section 210 and a control program to be executed by the processor 211. For example, the memory 212 stores parameters 213 used by the processor 211 to control the image processing section 235 and the optical adjusting section 233.

The processor 211 may be configured by a single processor or a plurality of processors may function as the processor 211. The processor 211 executes the control program to control the sections of the projector 200.

For example, the processor 211 selects, out of image supply devices coupled to the image interface section 241, an image supply device that outputs an image to be displayed. The processor 211 controls the image interface section 241 to output image data input from the image supply device to the image processing section 235.

The processor 211 outputs an execution instruction for image processing and the parameters 213 used for the image processing to the image processing section 235. The parameters 213 include, for example, a geometrical correction parameter for correcting geometrical distortion of an image projected onto the screen SC. The image processing section 235 executes geometrical correction processing based on the parameters 213.

The processor 211 controls the light-source driving section 231 to perform control of lighting and extinction of the light source 221 and adjustment of luminance of the light source 221.

The processor 211 controls the optical modulating section 233 based on the parameters 213 and executes focus adjustment by the adjusting mechanism 224. Consequently, the projecting section 220 projects the image light L subjected to the focus adjustment based on the parameters 213.

The projector 200 includes a communication section 246. The communication section 246 executes wired data communication via a communication cable and/or wireless data communication and receives various data from an external device of the projector 200. The communication section 246 is, for example, a wireless communication device that executes wireless communication using Bluetooth, Wi-Fi, or NFC (Near Field Communication). The communication section 246 is, for example, a communication interface device that performs data communication via a LAN cable conforming to the Ethernet standard. Bluetooth, Wi-Fi, and Ethernet are registered trademarks.

The projector 200 includes a power supply section 247. The power supply section 247 includes a power supply circuit coupled to a commercial AC power supply AC, executes AC-DC conversion, voltage conversion, and the like, and supplies electric power to the sections of the projector 200. The power supply section 247 has a function of switching power supply to the sections of the projector 200 according to the control by the control section 210. For example, when the projector 200 shifts to a standby state S2 explained blow, the power supply section 247 stops the power supply to the projecting section 220, the light-source driving section 231, the light-modulating-device driving section 232, the optical adjusting section 233, the image processing section 235, the frame memory 236, and the like. When the projector 200 shifts to a normal operation state S3 explained below, the power supply section 247 starts the power supply to the projecting section 220, the light-source driving section 231, the light-modulating-device driving section 232, the optical adjusting section 233, the image processing section 235, the frame memory 236, and the like.

The projector 200 includes a receiving section 248. The receiving section 248 is coupled to the opening and closing detecting section 202 by the cable 203. A detection signal is input to the receiving section 248 from the opening and closing detecting section 202 via the cable 203. The receiving section 248 receives the detection signal and determines based on the received detection signal that the lid 20 is opened and notifies the opening of the lid 20 to the control section 210. Specifically, the receiving section 248 performs determination based on the detection signal output by the opening and closing detecting section 202 and, when determining that the cabinet 2 is switched from the closed state to the first open state or the second open state, performs notification to the control section 210.

The receiving section 248 determines based on the detection signal of the opening and closing detecting section 202 that the lid 20 is closed and notifies the closing of the lid 20 to the control section 210. Specifically, the receiving section 248 performs determination based on the detection signal output by the opening and closing detecting section 202 and, when determining that the cabinet 2 is switched from the first open state or the second open state to the closed state, performs notification to the control section 210.

Therefore, the control section 210 can detect from a detection result of the opening and closing detecting section 202 that the lid 20 is opened by the user and the lid 20 is closed by the user.

Figure 12:
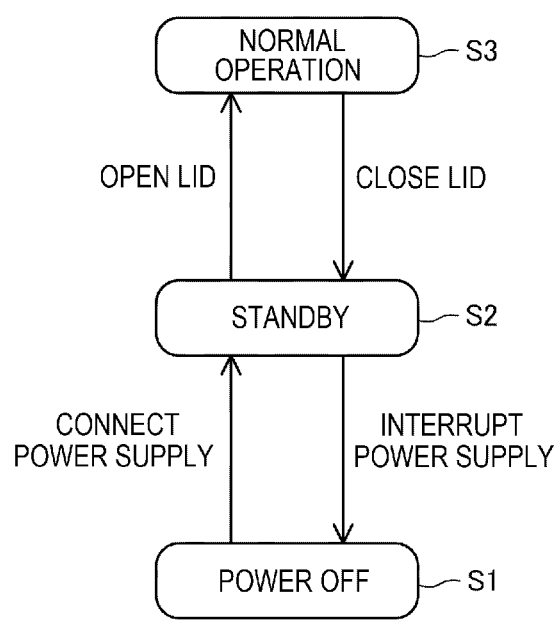
FIG. 12 is a state transition diagram of the projector.

FIG. 12 is a transition diagram of operation states of the projector 200.

The operation states of the projector 200 include a power OFF state S1, a standby state S2, and a normal operation state S3 shown in FIG. 12. The power OFF state S1 indicates a state in which the commercial AC power supply AC is not coupled to the power supply section 247.

The standby state S2 indicates a state in which the projector 200 cannot project the image light L and the control section 210 and the receiving section 248 are capable of executing minimum operations. The minimum operation of the receiving section 248 includes detection of an input signal from the opening and closing detecting section 202, determination of an open and closed state of the lid 20 based on the input signal, and notification to the control section 210. The minimum operation of the control section 210 indicates detection of notification from the receiving section 248 and control for the power supply section 247. Specifically, in the standby state S2, the control section 210 is capable of controlling the power supply section 247 according to notification input from the receiving section 248 to shift the projector 200 to the normal operation state S3. The standby state S2 corresponds to an example of the standby state.

The standby state S2 may be a state in which the input processing section 242 is capable of executing a minimum operation. The minimum operation of the input processing section 242 includes, for example, detection of operation by the operation panel 243 and/or the remote-controller light receiving section 244 and an operation for outputting an operation signal to the control section 210 based on the detected operation. In this case, the control section 210 may be capable of shifting the projector 200 to the normal operation state S3 according to an operation signal input from the input processing section 242.

In the standby state S2, electric power is supplied by the power supply section 247 to the sections that perform the minimum operations explained above and, on the other hand, the power supply to the sections including the projecting section 220 is stopped by the power supply section 247.

The normal operation state S3 is an operation state in which the projector 200 is capable of projecting the image light L. Electric power is supplied to the projecting section 220, the light-source driving section 231, the light-modulating-device driving section 232, the optical adjusting section 233, the image processing section 235, and the other sections from the power supply section 247. The normal operation state S3 corresponds to an example of the projection state.

In the power OFF state S1, when the commercial AC power supply AC is coupled to the power supply section 247, the power supply section 247 starts power supply. According to the start of the power supply from the power supply section 247, the control section 210 executes a start sequence and shifts to the standby state S2.

In the standby state S2, when a predetermine restoration condition is satisfied, the control section 210 controls the power supply section 247 to shift the projector 200 to the normal operation state S3. The restoration condition is that, for example, notification to the effect that the lid 20 is opened is received from the receiving section 248 or the input processing section 242 detects operation. In the standby state S2, when the commercial AC power supply AC is interrupted, the projector 200 shifts to the power OFF state S1.

In the normal operation state S3, when a predetermined standby condition is satisfied, the control section 210 controls the power supply section 247 to shift the projector 200 to the normal operation state S3. The standby condition is that, for example, notification to the effect that the lid 20 is closed is received from the receiving section 248. The standby condition is that, for example, the input processing section 242 detects operation for instructing a shift to the standby state or a state in which image data is not input to the image interface section 241 continues for a predetermined time or more. When receiving, from the receiving section 248, the notification to the effect that the lid 20 is closed, the control section 210 may shift the operation state of the projector 200 to the power OFF state S1.

Therefore, while the lid 20 is closed in a state in which the projector 200 is coupled to the commercial AC power supply AC, the projector 200 is in the standby state S2. When the lid 20 is opened in the standby state S2 and the cabinet 2 is switched to the first open state or the second open state, the projector 200 shifts to the normal operation state S3 and projects the projection image P.

In the normal operation state S3, when the lid 20 is closed and the cabinet 2 is switched to the closed state, the projector 200 shifts to the standby state S2. In this process, the projector 200 stops the projection of the image light L.

As explained above, the projection system 1 includes the projector 200 that projects the image light L and the cabinet 2 on which the projector 200 is mounted. The cabinet 2 includes the cabinet main body 10 and the housing section 19 provided in the cabinet main body 10, the projector 200 being set in the housing section 19. The cabinet 2 includes the lid 20 provided in the opening section 19B for allowing the image light L projected by the projector 200 set in the housing section 19 to pass, the lid 20 switching the closed state in which the opening section 19B is closed and the open state in which the opening section 19B is opened. The open state is at least one of the first open state and the second open state. In the projection system 1, by aligning the lid 20 with the position corresponding to the screen SC in the open state, the position of the projector 200 is determined in the predetermined projection position with respect to the screen SC. The projector 200 projects the image light L onto the screen SC from the predetermined projection position to thereby form the rectangular projection image P on the screen SC.

With this configuration, if the lid 20 of the cabinet 2 is opened and work for aligning the lid 20 with the position corresponding to the screen SC is performed, the projector 200 can project the rectangular projection image P. Therefore, the projector 200 can be easily set in an appropriate position.

The cabinet 2 is furniture on which the projector 200 that projects the image light L is mounted. The cabinet 2 includes the cabinet main body 10 and the housing section 19 provided in the cabinet main body 10, the projector 200 being set in the housing section 19. The cabinet 2 includes the lid 20 provided in the opening section 19B for allowing the image light L projected by the projector 200 set in the housing section 19 to pass, the lid 20 switching the closed state in which the opening section 19B is closed and the open state in which the opening section 19B is opened. The open state is at least one of the first open state and the second open state. The cabinet 2 aligns the lid 20 with the position corresponding to the screen SC in the open state to thereby determine the position of the projector 200 in the predetermined projection position where the projector 200 forms the rectangular projection image P on the screen SC.

If work for setting the projector 200 in the cabinet 2 to thereby open the lid 20 of the cabinet 2 and align the lid 20 with the position corresponding to the screen SC is performed, the projector 200 can project the rectangular projection image P. Therefore, it is possible to easily set the projector 200 in an appropriate position.

The lid 20 includes the end portion 21A fixed in the position projecting from the side surface of the cabinet main body 10 in the open state. By bringing the end portion 21A into contact with the surface of the cabinet 2 corresponding to the screen SC, the position of the projector 200 is determined in the predetermined projection position. Accordingly, by brining the end portion 21A of the lid 20 into contact with the wall W, the position of the projector 200 can be aligned with the predetermined projection position where the rectangular projection image P is projected. Therefore, it is possible to easily perform adjustment of a projection position of the projector 200.

The predetermined projection position of the projector 200 is a position where the angle formed by the optical axis AX of the image light L and the screen SC in the top view is the first angle θ1 and the angle formed by the optical axis AX of the image light L and the screen SC in the side view is the second angle θ2. The projector 200 is set to project the image light L for forming the rectangular projection image P when the image light L is projected at the first angle θ1 and the second angle θ2. By setting the projector 200 in the cabinet 2, the projector 200 can be set in the position where the angle of the optical axis AX with respect to the screen SC is the first angle θ1 and the second angle θ2. Accordingly, it is possible to dispose the projector 200 in an appropriate position with simple work and cause the projector 200 to project the rectangular projection image P.

The projector 200 includes the adjusting mechanism 224 that adjusts the focus of the projection image P. The adjusting mechanism 224 is set such that the projection image P is focused when the image light L is projected from the predetermined projection position. Specifically, the adjusting mechanism 224 is set with a focus of the projection optical system 223 associated with the distance D2 from the position P3 of the projection light source section 201 to the position of the screen SC. Accordingly, it is possible to dispose the projector 200 in an appropriate position with simple work and cause the projector 200 to project the high-quality projection image P.

When projecting the image light L onto the screen SC from the predetermined projection position, the projector 200 forms the projection image P having a size set in advance. If the cabinet 2 is used, the projector 200 can be set in the position where the angle of the optical axis AX with respect to the screen SC is the first angle θ1 and the second angle θ2 and the distance from the position P3 of the projection light source section 201 to the screen SC is the distance D2. In this position, it is possible to cause the projector 200 to project the projection image P having a set size. Therefore, it is possible to set, using the cabinet 2, the projector 200 in a position where the projection image P having a desired size is projected.

Since the cabinet 2 includes the legs 30 that movably support the cabinet main body 10, the cabinet 2 can be easily moved. Accordingly, by moving the cabinet 2 to the position of the screen SC that the user desires to use and aligning the position of the lid 20 with a surface corresponding to the screen SC, it is possible to project the rectangular projection image P on a desired screen SC.

The projector 200 has a plurality of operation states including the normal operation state S3 in which the image light L is projected and the standby state S2 in which the image light L is not projected. The cabinet 2 includes the opening and closing detecting section 202 that detects that the lid 20 is opened. In the projection system 1, when the opening and closing detecting section 202 detects that the lid 20 is opened, the projector 200 shifts to the normal operation state S3. With this configuration, by opening the lid 20, the projector 200 can be shifted to the normal operation state S3. Accordingly, by aligning the position of the lid 20 with the wall W and opening the lid 20, setting of the projector 200 and operation for turning on the projector 200 are completed. Projection of the projection image P can be quickly started.

The embodiment explained above indicates a specific example applied with the present disclosure. The present disclosure is not limited to the embodiment.

For example, in the embodiment, the normal operation state S3 is explained as an example of the projection state and the standby state S2 is explained as an example of the standby state. This is an example. The projection state may be an operation state in which the projector 200 can project the image light L, the operation state being different from the normal operation state S3. For example, the projection state may be an operation state in which the projector 200 does not project the image light L or an operation state in which the projector 200 projects the projection image P of a black screen, the operation state being an operation state in which the projector 200 can quickly project the projection image P according to operation of the remote controller 245 or the operation panel 243 or an input of image data to the image interface section 241. The standby state only has to be a state in which the projector 200 does not project the image light L and stays on standby and may be an operation state different from the standby state S2 explained above.

For example, the lid 20 is explained as an example of the opening and closing member in the embodiment. However, the present disclosure is not limited to this. The opening and closing member is not limited to a folding-type plate-like member like the lid 20 and may be configured to turn one or a plurality of plate-like members to able to be unfolded and housed to open and close the opening section 19B.

The contact section that aligns the position of the cabinet 2 is not limited to the end portion 21A of the rectangular lid component 21. The contact section may be, for example, a bar-like member attached to the lid 20 or a protrusion having another shape formed in the lid 20.

In the embodiment, as an example of the furniture, the box-shaped cabinet 2 including the cabinet main body 10 configured by the front panel 11, the right side panel 12, the left side panel 13, the rear panel 14, and the bottom panel 16 is illustrated. The present disclosure is not limited to this. The furniture main body may have a configuration in which the front surface, the side surface, the rear surface, and the like are not closed and may be, for example, a frame configured by a bar-like member. The furniture main body may have a configuration in which a flexible sheet is disposed on the front surface, the side surface, the rear surface, and the like of the frame.

The power supply section 247 is not limited to receiving power supply from the commercial AC power supply AC. For example, the power supply section 247 may include a battery and may be configured to supply electric power to the sections of the projector 200 based on electric power supplied from the battery. In this case, the projector 200 is switched to the power OFF state S1 when the battery is not attached or when residual power of the battery included in the power supply section 247 is lower than a predetermined level.

When the input processing section 242 receives operation for instructing to turn off the projector 200 in the standby state S2 or the normal operation state S3, the control section 210 may shift the projector 200 to the power OFF state S1.

The opening and closing detecting section 202 is not limited to be coupled to the projector 200 by the cable 203. For example, the opening and closing detecting section 202 may be coupled to the projector 200 by wireless communication and wirelessly transmit a detection signal to the projector 200.

The functional sections shown in the block diagram of the projection system 1 indicate functional components and do not limit specific implementation forms. For example, hardware individually corresponding to the functional sections does not always need to be mounted. It is also naturally possible that one processor executes a program to realize functions of a plurality of functional sections. A part of the functions realized by software in the embodiments may be realized by hardware or a part of the functions realized by hardware may be realized by software. Besides, specific detailed configurations of the other sections of the projector 200 can be optionally changed without departing from the gist.

What is claimed is:

1. A projection system comprising:
a projector configured to project image light; and
furniture on which the projector is mounted comprises:
　a furniture main body;
　a setting section provided in the furniture main body and houses the projector; and
　an opening and closing member provided in an opening through which the image light passes, the opening and closing member switching a closed state in which the opening is closed and an open state in which the opening is opened, wherein
by aligning the opening and closing member with a position corresponding to a projection surface in the open state, a position of the projector is determined in a predetermined projection position with respect to the projection surface, and
the projector projects the image light onto the projection surface from the predetermined projection position to thereby form a rectangular projection image on the projection surface.

2. The projection system according to claim 1, wherein
the opening and closing member includes an end portion fixed in a position projecting from a side surface of the furniture main body in the open state, and
the position of the projector is determined in the predetermined projection position by bringing the end portion into contact with a surface corresponding to the projection surface.

3. The projection system according to claim 1, wherein
the predetermined projection position is a position where an angle formed by an optical axis of the image light and the projection surface in a top view is a first angle and an angle formed by the optical axis of the image light and the projection surface in a side view is a second angle, and
the projector forms the rectangular projection image when the image light is projected at the first angle and the second angle.

4. The projection system according to claim 1, wherein
the projector includes an adjusting mechanism configured to adjust a focus of the projection image, and
the adjusting mechanism is set to focus the projection image when the image light is projected from the predetermined projection position.

5. The projection system according to claim 1, wherein, when projecting the image light onto the projection surface from the predetermined projection position, the projector forms the projection image having a size set in advance.

6. The projection system according to claim 1, wherein the furniture includes legs configured to movably support the furniture main body.

7. The projection system according to claim 1, wherein
the projector has a plurality of operation states including a projection state in which the projector projects the image light and a standby state in which the projector does not project the image light,
the furniture includes a sensor configured to detect that the opening and closing member is opened, and
the projector shifts to the projection state when the detecting section detects that the opening and closing member is opened.

8. Furniture on which a projector is mounted, the furniture comprising:
a furniture main body;
a setting section provided in the furniture main body and houses the projector; and
an opening and closing member provided in an opening through which the image light projected by the projector passes, the opening and closing member switching a closed state in which the opening is closed and an open state in which the opening is opened, wherein
by aligning the opening and closing member with a position corresponding to a projection surface in the open state, a position of the projector is determined in a predetermined projection position where the projector forms a rectangular projection image on the projection surface.

\* \* \* \* \*